United States Patent [19]

George et al.

[11] 4,176,157

[45] Nov. 27, 1979

[54] CALCINING CALCIUM SULPHATE DIHYDRATE

[75] Inventors: James S. George, Brampton; Arthur G. T. Ward, Wilford; Percy N. Pastakia, Dunkirk, all of England

[73] Assignee: BPB Industries Limited, London, England

[21] Appl. No.: 825,755

[22] Filed: Aug. 18, 1977

Related U.S. Application Data

[60] Division of Ser. No. 708,461, Jul. 26, 1976, abandoned, which is a continuation of Ser. No. 523,936, Nov. 14, 1974, abandoned.

[51] Int. Cl.$^2$ .................. B01J 6/00; C04B 11/02
[52] U.S. Cl. .................. 422/114; 366/150; 366/169; 422/205; 422/228; 422/231; 422/164; 422/204; 423/171; 423/555; 432/151; 432/173; 432/174; 432/222; 422/164; 422/204
[58] Field of Search .......... 23/277 R, 284; 432/139, 432/151, 173, 174, 222, 233; 366/150, 169; 259/23, 24; 423/170, 171, 172, 554, 555; 106/109, 110

[56] References Cited

U.S. PATENT DOCUMENTS

| 2,437,917 | 3/1948 | Hoeh ..................... 366/169 |
| 2,592,709 | 4/1952 | Kinnaird .................. 366/169 |
| 2,974,939 | 3/1961 | Landrieu .................. 423/171 |
| 3,236,509 | 2/1966 | Blair ...................... 423/172 |
| 3,307,915 | 3/1967 | Conroy et al. ............. 23/277 R |
| 3,482,520 | 12/1969 | Larsen ................... 366/169 X |
| 3,861,859 | 1/1975 | Sherwood ................. 432/233 X |

FOREIGN PATENT DOCUMENTS 610439 10/1948 United Kingdom .................. 423/170

Primary Examiner—Joseph Scovronek
Attorney, Agent, or Firm—Robert H. Robinson; Kenneth E. Roberts

[57] ABSTRACT

A method and apparatus for calcining calcium sulphate dihydrate in a calcination vessel in which the dihydrate is heated in the vessel to calcination temperature not only by heat applied to the exterior of the vessel but also by hot gas, especially hot gaseous combustion products, supplied into the interior of the mass of calcining material within the vessel. The supply of hot gas according to the invention can improve the production rate in both batch and continuous calcination operations without adversely affecting the product quality, by permitting increase in the heat input to the vessel without entailing the risk of vessel bottom burn-out.

7 Claims, 6 Drawing Figures

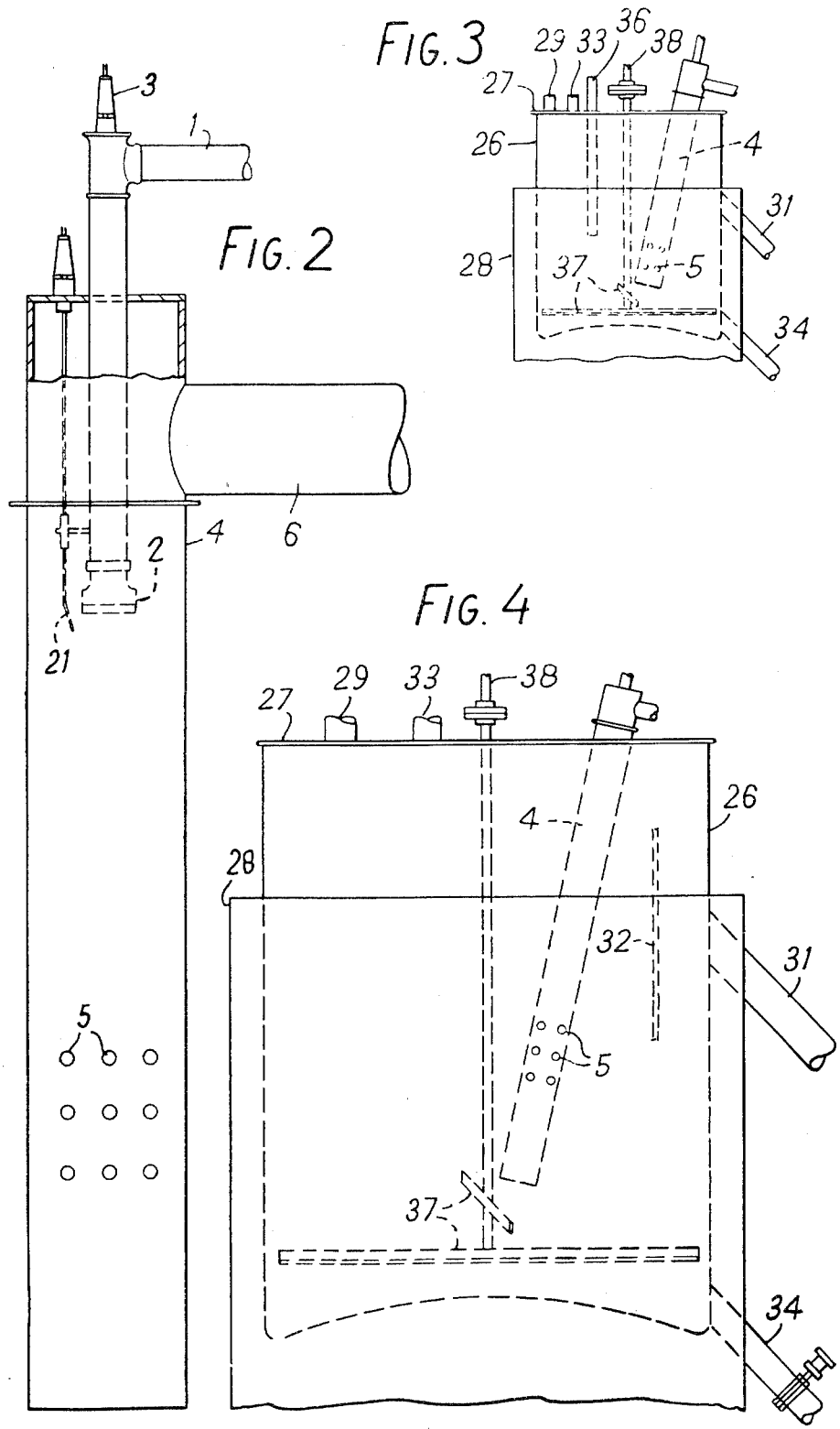

CALCINING CALCIUM SULPHATE DIHYDRATE

This is a division of application Ser. No. 708,461, filed July 26, 1976, which itself is a continuation application of Ser. No. 523,936 filed Nov. 14, 1974, and both of said applications having been abandoned.

This invention relates to a method and apparatus for calcining calcium sulphate dihydrate, and more especially to the production of calcined plaster from gypsum employing a calcining kettle.

Gypsum calcination can be carried out as a batch or continuous operation. In our view, the production rate in both batch and continuous kettle calcinations is at present limited by the maximum permissible heat transfer through the kettle bottom. The quantity of heat which can be transferred through the kettle bottom is limited because there is a maximum allowed temperature of the bottom metal, steel, of the kettle. Above this limit there is a danger of frequent kettle bottom burn-outs. The present invention aims to increase the heat input to the calcining kettles in both batch and continuous operations, thereby increasing the production capacity of the kettle, without risk of adversely affecting the product quality, or of significantly increasing kettle bottom temperatures.

According to the present invention there is provided a method of calcining calcium sulphate dihydrate in which the dihydrate is heated in a calcination vessel by heat applied on the exterior of the vessel and by hot gas, preferably hot gaseous combustion products, supplied through a tube into the interior of the mass of dihydrate within the vessel. The hot gas should not of course react with the vessel contents.

The invention also provides apparatus for calcining calcium sulphate dihydrate comprising a calcination vessel provided with means for heating its exterior, a tube leading from the exterior to the interior of the vessel, and means for supplying hot gas, preferably hot gaseous combustion products, to the tube.

In the preferred form of the invention, use is made of a fuel burner enclosed within or connected to the tube, the tube passing downwards from the top of the calcination vessel to lead and direct combustion gases into the bed of gypsum mineral or other form of calcium sulphate dihydrate. The combustion gases are preferably distributed through rows of distribution holes located on the tube within the bed. The burner may be conveniently located on top of the gypsum calcining kettle, with the tube leading into the bed. The tube should preferably be open-ended at the lower end. An auxiliary-air inlet should preferably be provided at the upper end of the tube whereby an auxiliary air flow can cool the walls of the tube in the free space above the bed, and control the temperature of the mixture of air and hot combustion gases in the tube as required, for the production of hemihydrate plasters, anhydrous plasters and/or mixtures including projection plaster.

For the insertion of the tube inside the existing conventional calcination kettles, modifications may have to be made to some of the existing stirrer blades to allow location of the tube within the kettle. It may be possible to use a hollow stirrer shaft as the combustion tube, or the combustion tube may be mounted concentrically around the shaft. These modifications will not, in general, adversely affect the performance of the kettle, or the characteristics of the plaster product.

The present invention will now be more fully described by way of example only, with reference to the accompanying drawings, in which:

FIG. 2 shows partly in section the heat-supplying tube, and FIGS. 3 and 4 show side elevations of two types of continuous calcination kettles provided with heat-supplying tubes.

Figure 1:
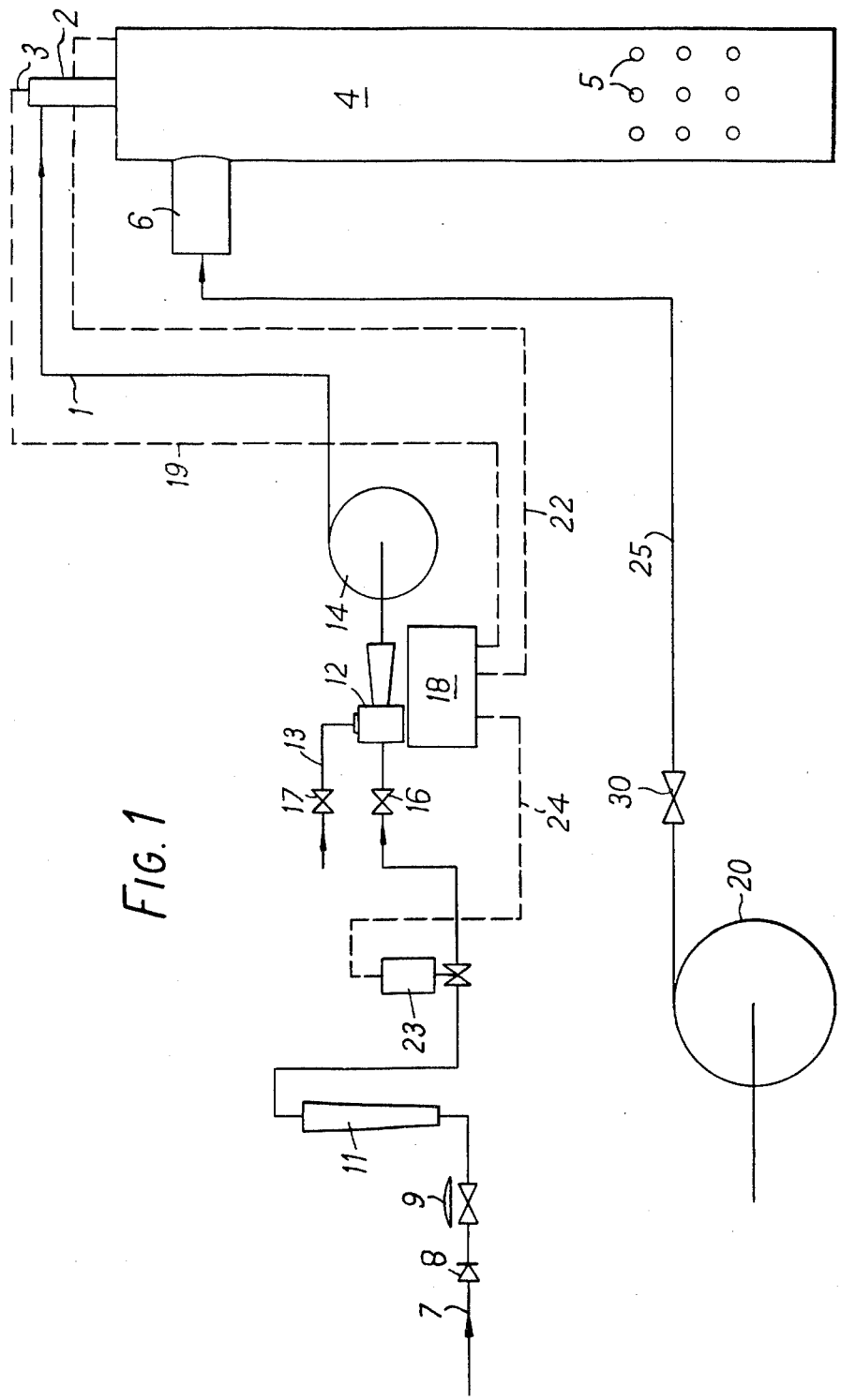
FIG. 1 illustrates schematically the control system for the heat-supplying tube used in the invention.

Referring to FIGS. 1 and 2, a mixture of air and fuel gas, for example natural gas, is supplied through a pipe 1 to a gas burner 2. The fuel-air mixture is ignited by a spark probe 3 and the hot, gaseous products of combustion pass downwardly through a tube 4 within which the burner 2 is enlclosed. The tube 4 in its preferred form is open-ended at its lower end and is provided with rows of holes 5 for distributing the hot gases to material in which the tube is immersed. Auxiliary air is supplied through an inlet 6 in the side of the tube 4 for cooling the walls of the tube 4 and controlling the temperature of the hot gases passing through the tube 4.

The fuel gas is supplied along a line 7 provided with a non-return valve 8, a governor 9 and a meter 11, to an injector 12 where it mixes with combustion air supplied along a line 13. The fuel-air mixture is then blown by a booster fan 14 to the burner 2 along the line 1. Control valves 16 and 17 are provided in the fuel and air lines 7 and 13, respectively, for controlling the flow rates, whereby the heat generated by the burner can be controlled and the optimum fuel to air ratio can be selected.

An electrical control unit 18 is provided, which supplies the electrical impulse for the ignition spark along a lead 19 to the spark probe 3. As a safety precaution a flame-sensing probe 21 is positioned within the heat-supplying tube 4 and is arranged to be impinged upon by the flame from the burner 2. The probe 21 is connected by a lead 22 to the control unit 18. In the event of flame failure, the control unit 18 automatically closes a solenoid-operated valve 23 in the fuel supply line 7, the valve 23 being connected to the control unit 18 by a lead 24.

The auxiliary air for the heat-supplying tube 4 is blown to the auxiliary air inlet from a fan 20 along a line 25, and the supply of the auxiliary air can be controlled by a valve 30 in the line 25.

Referring to FIGS. 3 and 4, there are shown heat-supplying tubes 4, each similar to that shown in FIG. 2, fitted into continuous calcination kettles of capacity of 3 cwt. and 1 ton, respectively. The same reference numerals will be used to refer to parts which are similar in each Figure.

The continuous calcination kettle, which is in the form of an open-topped vessel 26 having a lid 27 is positioned within a combustion chamber 28. A gas burner is mounted in the combustion chamber 28 beneath the closed bottom of the vessel 26, and heats a mass of gypsum contained in the vessel by conduction through the bottom and side walls of the vessel.

In each of the kettles shown, a heat-supplying tube 4 is mounted in the lid 27 of the kettle, and heats the gypsum directly by introducing hot combustion gases into the interior of the mass of gypsum through the distribution holes 5 and the open end of the tube 4.

Whilst the above system employs fuel gas, other fuels may be used.

In the continuous calcination process, raw gypsum is fed into the kettle continuously through an inlet 29 in the lid 27 and displaces the calcined product which leaves through a product overflow tube 31 leading from an opening in the side wall of the vessel 26. In FIG. 4, a baffle plate 32 is mounted within the calcination vessel 26. In order to prevent freshly introduced raw gypsum from leaving through the overflow tube 31 before it has been sufficiently calcined, the plate 32 extends into the mass of gypsum below the level of the opening in the side of the vessel to which the overflow tube 31 is connected, and extends into contact with the inner surface of the vessel 26 on either side of the said opening. In large-scale production it is preferred to employ a product outflow tube which is connected to the lower end of the vessel 26 and extends upwardly and outwardly. A downwardly and outwardly inclined discharge conduit communicates with this tube at a point below the level of the lid 27 of the vessel. The product flows up the outflow tube and then passes down the discharge conduit to a hot pit storage area.

Figure 6:
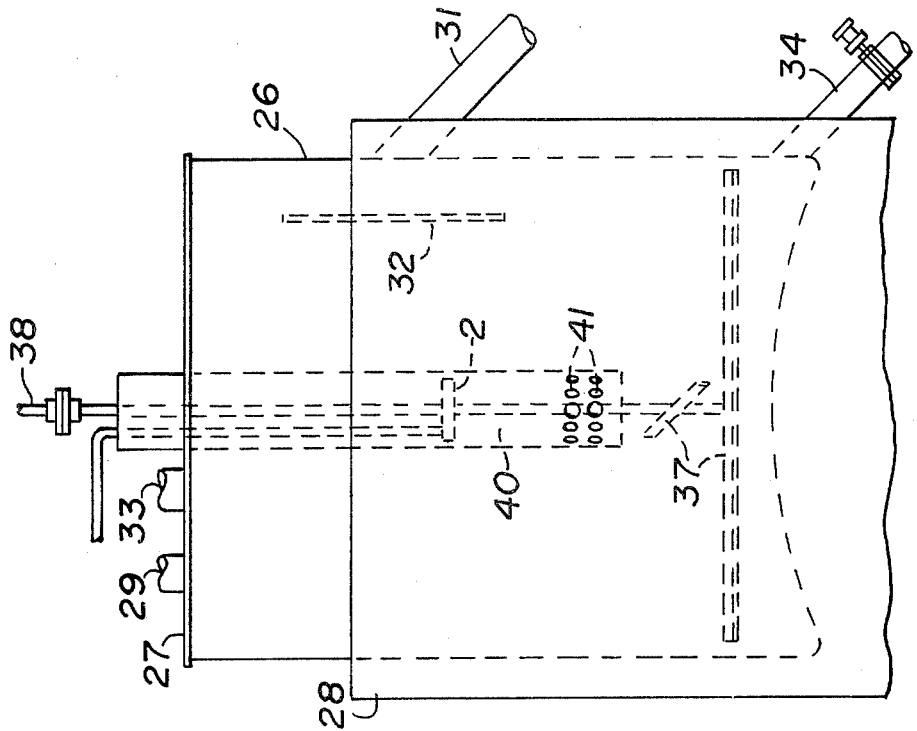
FIG. 6 is a side elevation of a continuous calcination kettle having a concentric heat-supplying tube surrounding the shaft of a stirrer.
Figure 5:
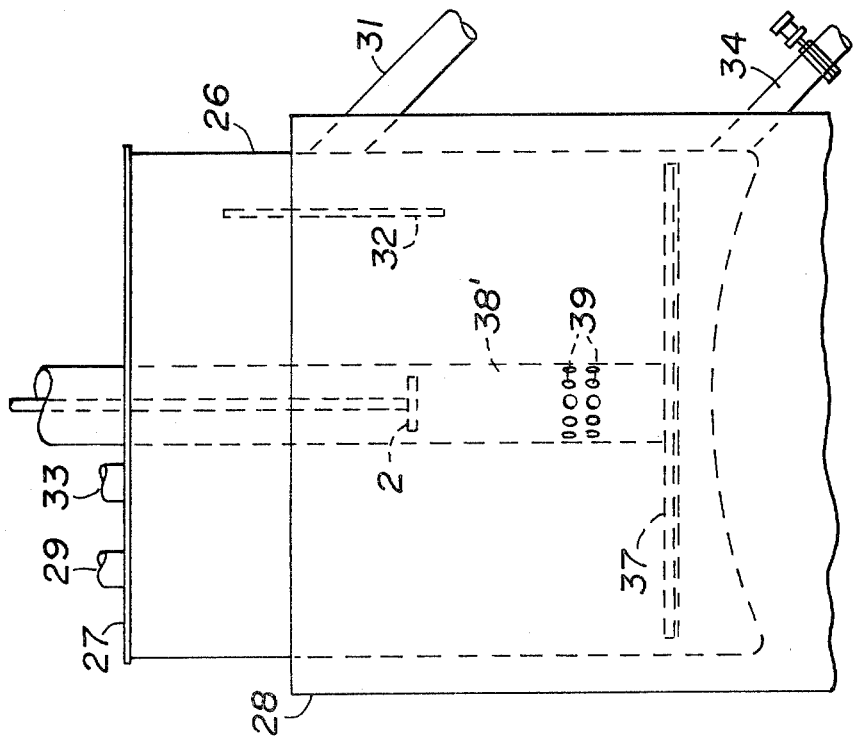
FIG. 5 is a side elevation of a continuous calcination kettle having a hollow shaft stirrer system.

The kettles are each provided with a vent 33 which leads to a cyclone or other dust collection equipment, and have an outlet 34 at the bottom of the vessel through which the contents of the kettle can be dumped when desired. The kettle shown in FIG. 3 has an inlet conduit 36 for returning to the interior of the mass of gypsum solids which have been separated at the cyclone. Each kettle has stirrer paddles 37 mounted on a rotating shaft 38 below the end of the tube 4, for stirring the mass of material in the vessel 26 during the calcination process. As shown in FIG. 5, instead of employing the tube 4, the shaft 38' could be made hollow and be provided with holes 39 along its length. Alternatively, as shown in FIG. 6, the shaft 38 could be surrounded by a concentrically arranged combustion tube 40 and be provided with holes 41 along its length. The modified shaft could then be used to introduce hot gaseous products of combustion into the mass of gypsum.

In the following Example, a continuous operation was carried out employing the kettle shown in FIG. 3 with and without auxiliary heating from the tube 4, and employing natural gas as the fuel for the tube 4 and the bottom burner mounted under the vessel. The production rate with only the conventional kettle bottom burner in operation was 42 kg/hr at a natural gas flow rate through the kettle bottom burner of approximately 4.2 m³/hr. When an equal proportion of additional heat was supplemented through the heat-supplying tube 4, the production rate could be increased substantially without considerably affecting the kettle bottom temperature or the chemical composition of the product (hemihydrate plaster), although the plaster is more dispersive. The chemical analyses and kettle bottom temperatures of the product with and without the use of submerged combustion are illustrated in the following Table:

|  | With only the conventional kettle bottom burner | Kettle bottom burner plus heat-supplying tube 4 |
| --- | --- | --- |
| Gypsum mineral feed (kg/hr) | 50 | 110 |
| Product discharge (kg/hr) | 42 | 74 |
| Calcination temperature (°C.) | 153 | 170 |
| Natural gas flow rate to kettle bottom burner (m³/hr) | 4.19 | 4.25 |
| Natural gas flow rate to burner 2 (m³/hr) | — | 4.25 |
| Kettle bottom temperature (°C.) | 269 | 266 |
| Proximate Analysis: |  |  |
| Free water % | 0.57 | — |
| Soluble anhydrite % | — | 5.9 |
| Hemihydrate % | 68 | 69.7 |
| Gypsum % | 8.36 | 0.98 |

While a continuous calcination process has been described in detail above, it is apparent that the heat-supplying tube could be used as an auxiliary heating source in batch calcination of calcium sulphate dihydrate.

We claim:

1. Apparatus for calcining calcium sulfate dihydrate (gypsum) comprising an open-topped, closed-bottom, calcination vessel adapted to contain a mass of calcining gypsum having a lid thereon to close said vessel; a combustion chamber located beneath the closed bottom of said vessel and a heat source means in said combustion chamber to supply heat to the exterior of said vessel; inlet means adapted for feeding raw gypsum into said vessel; a heat-supplying tube mounted in the lid and extending into said vessel, said tube having a closed end, an open end and distribution holes near the open end with said open end and distribution holes placed in the interior of said vessel; a source of hot combustion gases located near the closed end of said tube whereby said hot combustion gases pass through said tube and are directly introduced into the interior of said vessel through said open end and said distribution holes of said tube and into the mass of gypsum; agitation means mounted on a rotatable shaft and extending into said vessel; and a product overflow tube leading from an opening in the side wall of said vessel.

2. An apparatus in accordance with claim 1 in which said agitation means is located below the open end of said heat-supplying tube.

3. An apparatus in accordance with claim 1 in which a vent is located in said lid with said vent being connected to dust collection equipment and second inlet means located near the top of said vessel to return to the interior of said vessel gypsum solids separated by said dust collection equipment.

4. An apparatus in accordance with claim 1 in which an inlet opening is located in said heat-supplying tube near the closed end thereof to supply air to the interior of said tube for cooling the walls of said tube and for controlling the temperature of the hot combustion gases passing through said tube.

5. An apparatus in accordance with claim 1 in which a gas burner is the source of hot combustion gases located inside of and near the closed end of said heat-supplying tube and a flame-sensing probe is positioned within said tube in such a manner that the flame from said gas burner impinges upon said probe, and said probe is electrically connected to a control unit controlling the operation of a valve in a fuel supply line connected to said gas burner, whereby in the event of flame failure, the valve in the fuel supply line is automatically closed.

6. An apparatus in accordance with claim 1 in which said heat-supplying tube is concentrically positioned around said rotatable shaft.

7. Apparatus for calcining calcium sulfate dihydrate (gypsum) comprising an open-topped, closed-bottom, calcination vessel adapted to contain a mass of calcining gypsum having a lid thereon to close said vessel; a combustion chamber located beneath the closed bottom of said vessel and a heat source means in said combustion chamber to supply heat to the exterior of said vessel; inlet means adapted for feeding raw gypsum into said vessel; agitation means mounted on a hollow, rotatable shaft and both the agitation means and the bottom portion of the hollow rotatable shaft extend into the interior of said vessel, said hollow rotatable shaft also serving as a heat-supplying tube with distribution holes located in the wall of the bottom portion of the shaft; a source of hot combustion gases located near the closed end of said hollow shaft whereby the hot gases are directly introduced into the interior of said vessel through said distribution holes and into the mass of gypsum; and a product overflow tube leading from an opening in the side wall of said vessel.

* * * * *